US011184490B2

(12) United States Patent
Takatoh

(10) Patent No.: US 11,184,490 B2
(45) Date of Patent: Nov. 23, 2021

(54) IMAGE FORMING APPARATUS, NON-TRANSITORY COMPUTER-READABLE MEDIUM, AND CONTROL METHOD

(71) Applicant: SHARP KABUSHIKI KAISHA, Sakai (JP)

(72) Inventor: Kiyoshi Takatoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/068,508

(22) Filed: Oct. 12, 2020

(65) Prior Publication Data
US 2021/0112168 A1 Apr. 15, 2021

(30) Foreign Application Priority Data

Oct. 15, 2019 (JP) .............................. JP2019-188334

(51) Int. Cl.
*H04N 1/00* (2006.01)
*H04N 1/44* (2006.01)
(52) U.S. Cl.
CPC ..... *H04N 1/00381* (2013.01); *H04N 1/00251* (2013.01); *H04N 1/00896* (2013.01); *H04N 1/00925* (2013.01); *H04N 1/4433* (2013.01); *H04N 2201/0094* (2013.01)
(58) Field of Classification Search
CPC ........... H04N 1/00381; H04N 1/00251; H04N 1/00896; H04N 1/00925; H04N 1/4433; H04N 2201/0094

USPC ......................................................... 358/1.13
See application file for complete search history.

(56) References Cited

U.S. PATENT DOCUMENTS

| 10,409,536 B2 | 9/2019 | Hanada |  |
|---|---|---|---|
| 2014/0146360 A1* | 5/2014 | Berg | B41F 33/0009 358/1.15 |
| 2015/0055168 A1* | 2/2015 | Kato | H04N 1/0035 358/1.15 |
| 2016/0205284 A1* | 7/2016 | Fujimoto | H04N 1/2137 358/1.18 |
| 2017/0264765 A1* | 9/2017 | Nobutani | H04N 1/00395 |

FOREIGN PATENT DOCUMENTS

JP 2018-192661 A 12/2018

* cited by examiner

*Primary Examiner* — Neil R McLean
(74) *Attorney, Agent, or Firm* — ScienBiziP, P.C.

(57) ABSTRACT

An image forming apparatus includes a CPU and a gesture detection part. The gesture detection part outputs data for a gesture corresponding to a hand action of a user present in front or in the vicinity of an apparatus body, to the CPU. The CPU detects presence or absence of the gesture and the type of the gesture in accordance with output from the gesture detection part. The CPU, upon detecting the gesture, checks details of the gesture against details of the preregistered, registered gesture, and if the detected gesture is the registered gesture, the CPU executes processing allocated to the detected, registered gesture.

5 Claims, 10 Drawing Sheets

FIG. 5

GESTURE MANAGEMENT TABLE

| PROCESSING DETAILS | REGISTERED GESTURE DETAILS |
|---|---|
| COPYING | ← |
| FAX | → |
| SCANNING | ↓ |
| E-mail | ↑ |
| I-FAX | ↻ |
| NETWORK PRINTING | △ |
| JOB SITUATION | 2 |
| OPERATION GUIDANCE | 3 |
| SYSTEM SETTINGS | ✊ |
| HELP | ☝ |
| STATUS | ✌ |

FIG. 6

MEMORY MAP OF RAM 14 70

- 72 PROGRAM STORAGE AREA
  - 72a MAIN PROCESSING PROGRAM
  - 72b DISPLAY PROGRAM
  - 72c OPERATION DETECTION PROGRAM
  - 72d GESTURE DETECTION PROGRAM
  - 72e DETERMINATION PROGRAM
  - 72f PROCESSING EXECUTION PROGRAM
  - 72g COMMUNICATION PROGRAM
  - ⋮

- 74 DATA STORAGE AREA
  - 74a OPERATION INPUT DATA
  - 74b IMAGE FORMATION DATA
  - 74c GESTURE INFORMATION DATA
  - 74d TABLE DATA
  - ⋮

FIG. 8

GESTURE MANAGEMENT TABLE

| USER ID | PROCESSING DETAILS | REGISTERED GESTURE DETAILS |
|---|---|---|
| A | COPYING | ← |
| A | FAX | → |
| A | SCANNING | ↓ |
| B | COPYING | ↑ |
| B | FAX | ↻ |
| B | SCANNING | △ |
| C | COPYING | ↓ |
| C | FAX | ← |
| C | SCANNING | ↻ |

IMAGE FORMING APPARATUS, NON-TRANSITORY COMPUTER-READABLE MEDIUM, AND CONTROL METHOD

BACKGROUND OF THE INVENTION

Field of the Invention

The present invention relates to an image forming apparatus, a non-transitory computer-readable medium storing a control program, and a control method, and relates particularly to an image forming apparatus, a non-transitory computer-readable medium storing a control program, and a control method, for example, that makes a control corresponding to a user action.

Description of the Background Art

An example of such types of background art is disclosed in Japanese Patent Application Publication No. 2018-192661. The image forming apparatus of the background art generates on a display part, thumbnails of images applied with corresponding processing of setting items for each of a plurality of setting items related to image printing and the like; once any image of the individual images applied with the processing of the corresponding setting items is indicated by user's touch panel operation, the device receives an instruction to apply processing of the setting item corresponding to the indicated image to print a document.

However, the image forming apparatus of the background art requires touch operation for operating the image forming apparatus, which is a troublesome work. Moreover, a user unfamiliar with operation on the image forming apparatus sometimes has difficulty in finding out or fails to find out an image applied with a desired processing, and there is a room for improvement in view of operability.

Thus, the primary object of the present invention is to provide an image forming apparatus, a non-transitory computer-readable medium storing a control program and a control method that are novel.

Another object of the present invention is to provide an image forming apparatus, a non-transitory computer-readable medium storing a control program and a control method that can improve operability.

SUMMARY OF THE INVENTION

The first invention is an image forming apparatus including an apparatus body, a detector, a determinator, and a processing executor. The detector detects a gesture based on a hand action of a person present around the apparatus body. The determinator determines whether the gesture is a registered gesture corresponding to predetermined processing when the gesture is detected by the detector. The processing executor executes processing allocated to the registered gesture when the gesture detected by the determinator is determined as the registered gesture.

The second invention is an image forming apparatus in dependence upon the first invention, further including an imager that takes a captured image containing an image of a person present around the image forming apparatus, wherein the gesture detector detects a gesture from the captured image.

The third invention is an image forming apparatus in dependence upon the first or second invention, further including an authenticator that performs user authentication processing for a person about to utilize the image forming apparatus and permits login to the image forming apparatus for a preregistered, registered user, and a storage that stores a combination of a gesture and processing allocated to the gesture for every registered user, wherein the processing executor executes processing allocated to the gesture, in accordance with a combination of the gesture and processing for the registered user permitted for login, when the login is permitted in the authenticator.

The fourth invention is an image forming apparatus in dependence upon any of the first to third invention, wherein the image forming apparatus has a power-saving state with power consumption limited to no more than a predetermined value and a normal state with power consumption unlimited, and further includes a state setter that sets the power-saving state after satisfying a predetermined condition and experiencing a lapse of a predetermined time period from the time point of satisfying the predetermined condition in the normal state, wherein the processing executor executes processing of forbidding setting of the power-saving state when the gesture is detected by the gesture detector for a duration from the time point of satisfying the predetermined condition until a lapse of predetermined time period.

The fifth invention is a non-transitory computer-readable medium storing a control program of an image forming apparatus including an apparatus body, the program causing a processor of the image forming apparatus to execute a gesture detection to detect a gesture based on a hand action of a person present around the apparatus body, and processing execution to execute processing allocated to the gesture when the gesture is detected by the gesture detector.

The sixth invention is a control method of an image forming apparatus including an apparatus body, the method including (a) gesture detection to detect a gesture based on a hand action of a person present around the apparatus body, and (b) processing execution to execute processing allocated to the gesture when the gesture is detected by the gesture detector.

The present invention can improve operability of an image forming apparatus.

The objects described above, other objects, characters, and advantages of the present invention will be more apparent from the following detailed description of the embodiments with reference to the drawings.

BRIEF DESCRIPTION OF THE DRAWINGS

FIG. 5 is an illustrative view showing an example of a gesture management table.

FIG. 6 is an illustrative view showing an example of a memory map of the RAM shown in FIG. 2.

FIG. 8 is an illustrative view showing an example of the gesture management table of the second embodiment.

DESCRIPTION OF THE PREFERRED EMBODIMENTS

First Embodiment

Figure 1:
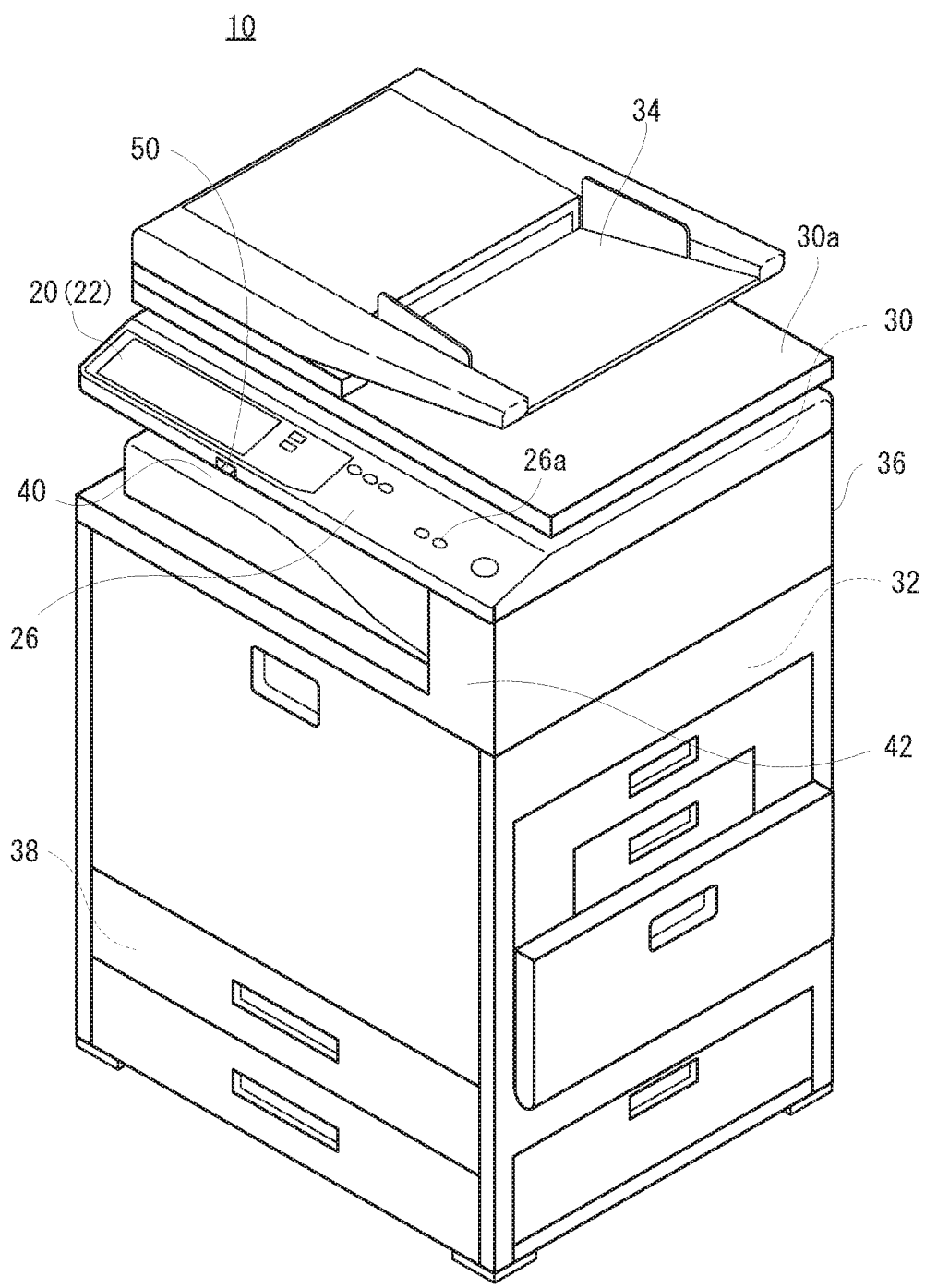
FIG. 1 is a perspective view showing appearance of an image forming apparatus that is one of the embodiments of the present invention.

FIG. 1 is a front view showing an appearance configuration of an image forming apparatus 10, which is an embodiment of the present invention. Referring to FIG. 1, in the first embodiment, the image forming apparatus 10 is a multifunctional machine (MFP: Multifunction Peripheral) having a copying function, a printer function, a scanner function, a facsimile function, and the like. Additionally, the present invention can be applied not only to a multifunctional machine but also to other image forming apparatuses such as a copying machine (copier), a printing device (printer), and a facsimile.

In this regard, herein, the image forming apparatus 10 and the front-back direction (depth direction) of its configuration members are defined given that the opposed face to the standing position of a user, i.e., the face involving an operation panel 26 described later, is set as the front face (frontage); and the image forming apparatus 10 and the right-left direction (horizontal direction) of its configuration members are defined on the basis of a state where the image forming apparatus 10 is seen from the user.

The image forming apparatus 10 has an apparatus body 36 including an image reading part 30, an image forming part 32, a document tray 34, a sheet feeder device 38, and a sheet delivery tray 40.

The image reading part 30 has a document mounting stage formed of a transparent material and is built into the apparatus body 36. Over the document mounting stage, a document presser cover 30a is attached via a hinge or the like so as to be freely opened or closed. This document presser cover 30a includes a document tray 34. The document presser cover 30a also includes an ADF (auto document feeder device) that automatically supplies a document mounted on the document tray 34.

Furthermore, the image reading part 30 includes a light source, a plurality of mirrors, an image forming lens, a line sensor, and the like. This image reading part 30 performs exposure onto the surface of a document by the light source, and guides reflected light reflected from the surface of the document to the image forming lens by the plurality of mirrors. Then, the image forming lens forms the reflected light into an image onto a light receiving element of the line sensor. The line sensor detects luminance or chromaticity of the reflected light forming the image on the light receiving element, and generates a readout image data based on an image on the surface of the document. CCD (Charge Coupled Device), CIS (Contact Image Sensor), or the like are used as the line sensor.

The image forming part 32 is built into the apparatus body 36, and disposed on the lower position of the image reading part 30. This image forming part 32 includes a photosensitive drum, a charging device, an exposure device, a development device, a transfer device, a fixing device, and the like. The image forming part 32 forms an image by electrophotographic manner on a recording medium (sheet) conveyed from the sheet feeder device 38 or the like, and delivers the image-formed sheet to the sheet delivery tray 40. In this regard, an image data read out in the image reading part 30, an image data sent from an external computer, or the like is used as a print image data for forming an image on a sheet. Additionally, the recording media is not limited to a sheet composed of paper, and a sheet other than paper is also used such as OHP film.

Incidentally, though detailed description is omitted, the image forming part 32 has a color printing function, and is configured to have an image forming station including a photosensitive drum, a charging device, a development device, and the like for each color of Y (yellow), M (magenta), C (cyan), and K (black).

The sheet delivery tray 40 is disposed between the image reading part 30 and the image forming part 32. The bottom face of the sheet delivery tray 40 is partitioned by the image forming part 32. The top face of the sheet delivery tray 40 is also partitioned by the image reading part 30. Furthermore, the left side face (the left side face as seen from the frontage) of the sheet delivery tray 40 is defined by the right-side face of a connective housing 42. In other words, the front face side, back face side, and left face side of the sheet delivery tray 40 are opened. In addition, the bottom face of the sheet delivery tray 40 has a slope face inclined downward to the connective housing 42.

Moreover, the operation panel 26 is disposed on the front face side of the image reading part 30. The operation panel 26 has a display 22 with a touch panel 20, and a plurality of operation buttons 26a.

The display 22 with the touch panel 20 displays software keys, messages, and the like for receiving various settings, printing instruction, and the like from a user. In one instance, the display 22 displays a variety of operation screens such as a home screen, which is a screen for selecting a desired job from various jobs that are executable by the image forming apparatus 10. In this regard, in this first embodiment, jobs mean copying (including scanning a document), printing, sending a facsimile (FAX), sending an electronic mail (E-mail), sending an internet facsimile (I-FAX), network printing, and the like.

The operation buttons 26a are hardware keys and include, for example, a home key and a main power source key. The home key is a key for displaying a home screen on the display 22. However, the operation buttons 26a may be software keys. In this case, the operation buttons 26a are displayed on the display 22 with the touch panel 20.

Incidentally, the software key refers to, for example, a key (icon) reproduced in a software manner on the display face of the display 22 with the touch panel 20. By contrast, the hardware key refers to a key (button) provided as a physical device. Additionally, operational input in the operation panel 26 means operational input to each part of the operation panel 26 such as operational input in the software key (e.g., touch input to the touch panel 20) or operational input in the hardware key (button operation with the operation button 26a).

Figure 2:
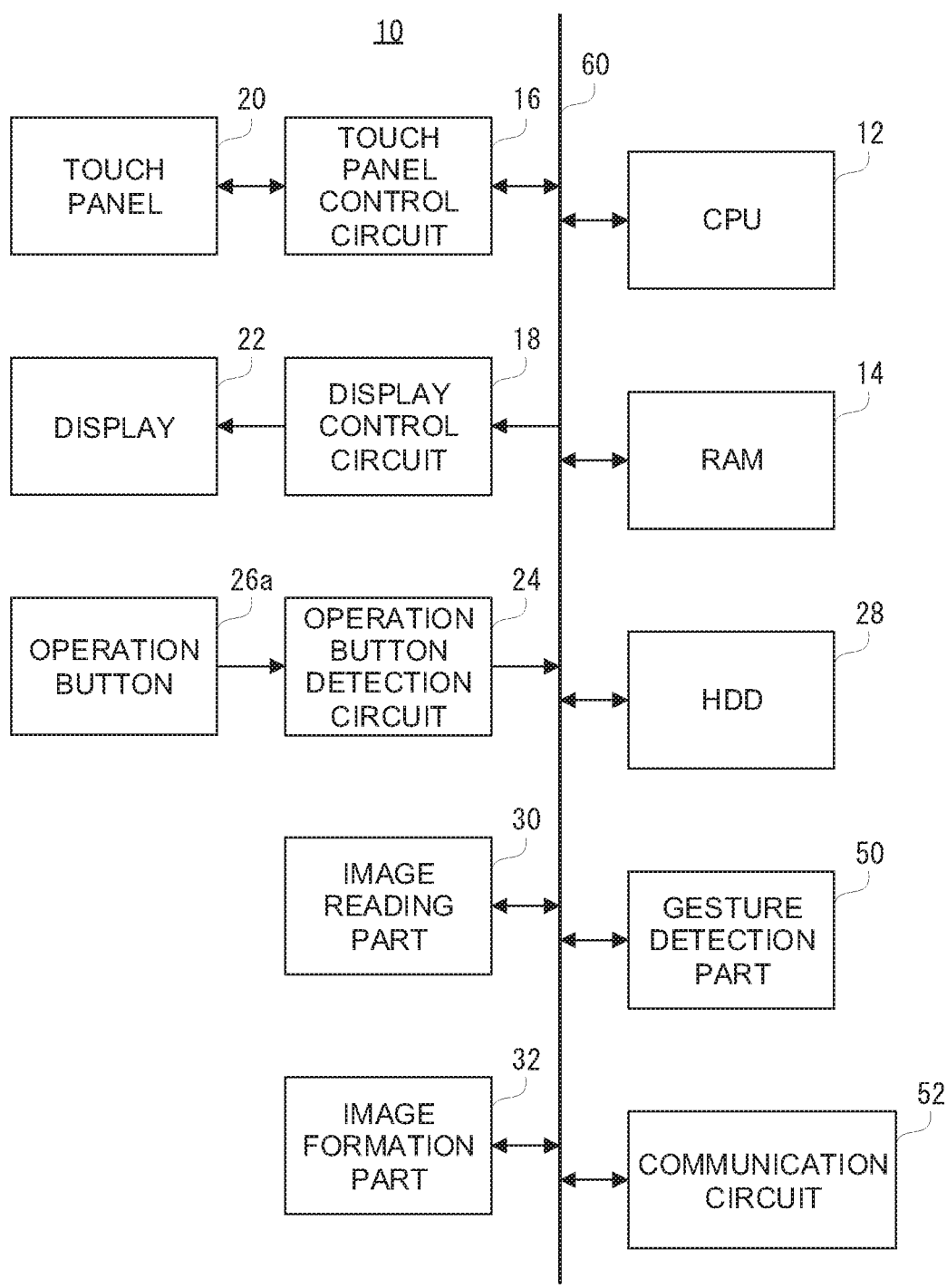
FIG. 2 is a block diagram showing an electrical configuration of the image forming apparatus shown in FIG. 1.

FIG. 2 is a block diagram showing an electrical configuration of the image forming apparatus 10 shown in FIG. 1. Referring to FIG. 2, the image forming apparatus 10 has a CPU 12. Connections to the CPU 12 via a bus 60 are made from a RAM 14, a touch panel control circuit 16, a display control circuit 18, an operation button detection circuit 24, a HDD 28, an image reading part 30, an image forming part 32, a gesture detection part 50, and a communication circuit 52. Furthermore, a touch panel 20 is connected to the touch panel control circuit 16; the display 22 is connected to the display control circuit 18; and the operation button 26a is connected to the operation button detection circuit 24.

The CPU 12 is responsible for general control of the image forming apparatus 10. The RAM 14 is used as a working area and a buffer area of the CPU 12.

The HDD 28 is the main storage device of the image forming apparatus 10, and appropriately stores a control program, data, and the like for the CPU 12 to control an action of each part of the image forming apparatus 10. However, another non-volatile memory such as SSD, flash memory, or EEPROM may be used instead of the HDD 28 or along with the HDD 28.

The touch panel control circuit 16 provides required electric voltage and the like to the touch panel 20, as well as detects touch operation (touch input) within the touch coverage of the touch panel 20 and outputs touch coordinate data indicating the position of the touch input to the CPU 12.

The touch panel 20 is a general-purpose touch panel, and any system can be used such as an electrical capacitance system, an electromagnetic induction system, a resistive film system, and an infrared system. In this first embodiment, a touch panel with an electrical capacitance system is used as the touch panel 20, and the touch panel 20 is disposed on the display face of the display 22. However, a touch panel display may also be used in which the touch panel 20 and the display 22 are formed integratedly.

The display control circuit 18 has GPU, VRAM, and the like, and under an instruction of the CPU 12, the GPU uses image formation data 74b stored in the RAM 14 (see FIG. 6) to generate display image data in the VRAM for displaying a variety of screens on the display 22, and outputs the generated display image data to the display 22. For example, an LCD or EL (Electro-Luminescence) display or the like can be used as the display 22.

The operation button detection circuit 24 outputs an operational signal or operational data corresponding to the operation of the operation button 26a described above to the CPU 12.

The gesture detection part 50 is disposed in the front face center of the operation panel 26 (see FIG. 1), and is provided for detecting a hand action (gesture) of a person (user) present around (in front or in the vicinity of) the apparatus body 36. Incidentally, details of the gesture detection part 50 will be described later.

The communication circuit 52 is a communication circuit for connecting to a network such as internet. This communication circuit 52 is a wired communication circuit or a wireless communication circuit, and communicates with an external computer such as a server via a network in accordance with an instruction from the CPU 12.

Incidentally, the electrical configuration of the image forming apparatus 10 shown in FIG. 2 is merely an example, and there is no need to limit to this.

As described above, the image forming apparatus 10 of the first embodiment is a multifunctional machine having a variety of functions, and can execute various jobs such as printing, sending a FAX, sending an E-mail, sending an I-FAX, and network printing.

Figure 3:
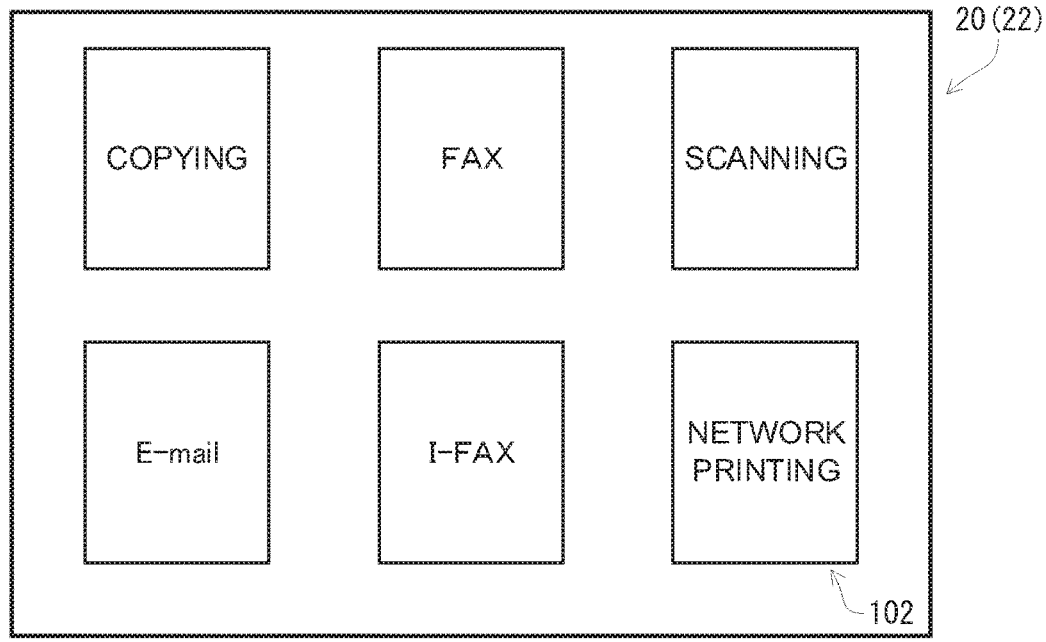
FIG. 3 is an illustrative view showing an example of a home screen in the image forming apparatus shown in FIG. 1.

When the image forming apparatus 10 is powered on and kept in standby mode in which each function is executable, the display 22 of the image forming apparatus 10 displays a home screen 100 as shown in FIG. 3. This home screen 100 displays an image of a job selection key (icon) 102 corresponding to each of jobs such as copying, FAX, scanning, E-mail, I-FAX, and network printing. The job selection key 102 is allocated with a function to display an operation screen (setting screen) for selecting a job and setting an action condition and the like in each job (job selecting function). In addition, although depiction is omitted, the home screen 100 may display an image of function selection keys for executing functions other than selection of each job, such as check for job situation, reference to operation guidance, change of system settings, reference to help, or check for status (other functions).

In conventional image forming apparatuses, a user can operate (touch) a job selection key 102 on the home screen 100 to select a desired job. Once a job is selected, the display displays in turn a variety of setting screens for setting an action condition of the selected job. The user operates an operation panel to set setting conditions of the job. Subsequently, upon pushing down a start key or the like provided on the operation panel, the job starts in accordance with the setting conditions of the job set by the user.

Moreover, the user can touch a function selection key on the home screen 100, and execute a desired function such as check for job situation.

As above, conventional image forming apparatuses require touch operation or button operation for operating an image forming apparatus, which is a troublesome work. Moreover, a user unfamiliar with operation on an image forming apparatus sometimes has difficulty in finding out or fails to find out an icon or button applied with a desired processing, and there is a room for improvement in view of operability.

Accordingly, the embodiment is made to allow the image forming apparatus 10 to be operated by a gesture based on a hand action of a person.

Returning to FIG. 2, the gesture detection part 50 outputs data for a gesture corresponding to a hand action of a user present in front or in the vicinity of the apparatus body 36 to the CPU 12. The CPU 12 detects presence or absence of the gesture and the type of the gesture in accordance with the output from the gesture detection part 50.

The gesture detection part 50 includes, for example a camera, and takes an image of a predetermined area (imaging area) set in front of the image forming apparatus 10 (apparatus body 36). This camera has an imaging element (image sensor), a lens, and a driver circuit, and performs imaging by converting imaged light as visible light taken from the image sensor into an electrical signal. Examples of the image sensors include a solid imaging element such as CCD or CMOS (Complementary Metal Oxide Semiconductor). Additionally, the lens is an optical element for forming incident light into an image on the light receiving part of the image sensor. The driver circuit drives the image sensor under instruction from the CPU 12.

Then, the camera outputs imaging data taken for the imaging area to the CPU 12, and the CPU 12 detects a gesture on the basis of an image (including a static image and a dynamic image) within the imaging area included in the imaging data.

In addition, although various methods have been proposed as methods for detecting a gesture using an image, any method can be used without limiting to a specific method in the present invention. Particular methods for detecting a gesture using an image are described and can be seen in Japanese Translation of PCT International Application Publication No. 2012-529088, Japanese Patent Application Publication No. 2016-086334, and Japanese Patent Application Publication No. 2014-048937.

Figure 4:
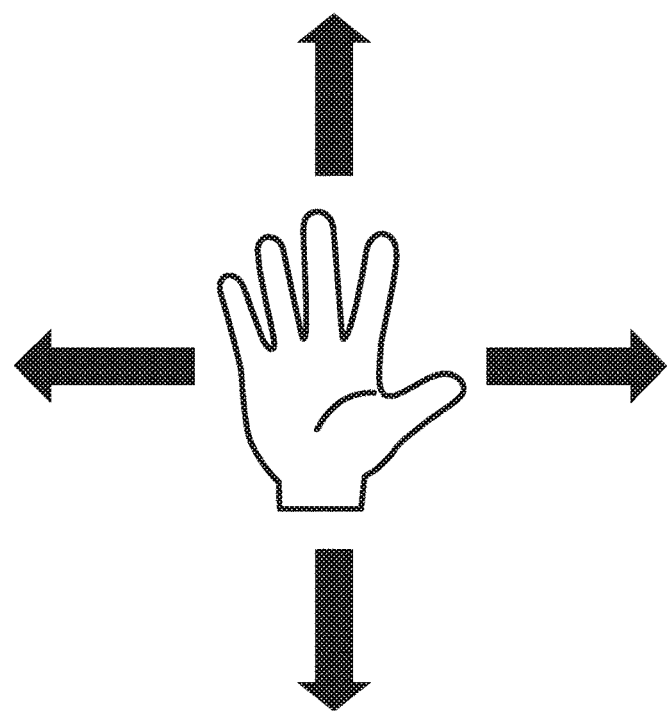
FIG. 4 is an illustrative view showing an example of a gesture.

Hereinafter, an action example of the image forming apparatus 10 will be described with reference to FIG. 4, FIG. 5, and the like. FIG. 4 is an illustrative view showing an example of a gesture. FIG. 5 is an illustrative view showing an example of a gesture management table.

In the embodiment, the image forming apparatus 10 can be operated by a gesture. As shown in FIG. 4, a gesture of the embodiment refers to a hand action (hand motion) of a person in a predetermined area (detection area) set around the image forming apparatus 10 (including at least the front of the image forming apparatus 10). Here, a hand refers to a part from a wrist to a fingertip in human.

In addition, the gestures include not only actions of moving linearly a hand up to down and left to right, but also an action of reciprocating a hand up to down or left to right, an action of moving a hand as drawing a circle (round) and a polygon (such as a triangle and a quadrangle), an action of moving a hand as drawing a numeral (Arabic numeral), and the like. The gestures further include not only actions of moving a hand, but also an action of raising a predetermined number of fingers and an action of clasping a hand (actions of changing the number of fingers), and the like.

In the embodiment, detection of gesture (gesture recognition) is started when a predetermined condition (start condition) is satisfied, and detection of gesture is terminated when a predetermined condition (termination condition) is satisfied. In other words, after starting detection of gesture and for a duration until terminating detection of gesture (during execution of gesture recognition), if a gesture is detected, processing corresponding to the gesture is executed. That is, before starting detection of gesture and after terminating detection of gesture (during suspension of gesture recognition), the gesture is not detected if the gesture is made around the image forming apparatus 10.

Here, the start condition, for example, may be made to be satisfied when a person enters a predetermined human detection area (including at least the detection area) set around the image forming apparatus 10 (including the front and the vicinity) from the outside of the human detection area; or may be made to be satisfied by operating a start button that is for starting detection of gesture, if the operation panel 26 includes such start button.

Meanwhile, the termination condition, for example, may be made to be satisfied when a person exits a human detection area to the outside of the human detection area, or may be satisfied by operating a termination button that is for terminating detection of gesture, if the operation panel 26 includes such termination button.

Here, the human detection area includes at least the detection area. Furthermore, whether a person enters the human detection area and whether a person exits the human detection area may be made to be determined in accordance with an image output from a camera included in the gesture detection part 50. In this case, the human detection area will be an area included at least in an imaging area.

Additionally, apart from the gesture detection part 50, the image forming apparatus 10 may also be made to include a human detection sensor for determining whether a person enters the human detection area and whether a person exits the human detection area. As the human detection sensor, for example, a distance sensor, a pyroelectric sensor, or a floor sensor (pressure sensor) can be used. As a distance sensor, for example, an infrared sensor, a supersonic sensor, a laser distance sensor, and the like are used. The human detection sensor outputs data corresponding to presence or absence of a person in the human detection area to the CPU 12, and the CPU 12 determines whether a person enters the human detection area and whether a person exits the human detection area, on the basis of the data output from the human detection sensor.

Furthermore, gestures capable of operating the image forming apparatus 10 are limited to a preregistered gesture (hereinafter sometimes referred to as "registered gesture"). In this regard, gestures detectable by the image forming apparatus 10 include at least a registered gesture. The registered gesture includes a plurality of types of gestures corresponding to hand behaviors. Each of the plurality of registered gestures corresponds (is allocated) to each of functions (processing) that are executable in the image forming apparatus 10.

The registered gesture is managed with a gesture management table as shown in FIG. 5. In the embodiment, the gesture management table is preformed, and corresponding table data 74d (see FIG. 6) is stored in a predetermined storage source such as the HDD 28 of the image forming apparatus 10 or an external server.

As shown in FIG. 5, the gesture management table describes details of registered gestures corresponding to details of processing (processing details) that is executable in the image forming apparatus 10. Here, each of the processing described in a column for processing details on the gesture management table is allocated with a gesture different from each other.

Incidentally, although each column of the gesture management table shown in FIG. 5 describes a character string corresponding to processing details and a figure corresponding to gesture details, these descriptions are created and used only in internal processing in the image forming apparatus 10. Thus, the description described in each column of the gesture management table may be described with human-unreadable symbols or the like. The same is applied to the gesture management table shown in FIG. 8.

Moreover, in the gesture management table shown in FIG. 5, the columns for processing details in the gesture management table describe details of 11 types of processing among processing executable in the image forming apparatus 10. For example, processing described in the columns for processing details in the gesture management table includes processing of selecting each job and displaying a setting screen in each job (job selection processing) and processing of executing a function other than selection of each job in the home screen 100 (other processing).

For example, job selection processing is allocated with a gesture of moving a hand. In particular, processing of selecting a copying job is allocated with a gesture of moving a hand leftward as seen from a user; processing of selecting a FAX job is allocated with a gesture of moving a hand rightward as seen from a user; processing of selecting a scanning job is allocated with a gesture of moving a hand downward; processing of selecting an E-mail job is allocated with a gesture of moving a hand upward; processing of selecting an I-FAX job is allocated with a gesture of moving a hand as drawing a circle; and processing of selecting a network printing job is allocated with a gesture as drawing a triangle.

Additionally, among other processing, some processing is allocated with a gesture of moving a hand. In particular, processing of executing a function to perform check for job situation is allocated with a gesture of moving a hand as drawing the Arabic numeral of "2", and processing of executing a function to perform reference to operation guidance is allocated with a gesture of moving a hand as drawing the Arabic numeral of "3".

Furthermore, among other processing, some processing is allocated with a gesture of changing the number of fingers. In particular, processing of executing a function to perform change of system settings is allocated with a gesture of clasping a hand; processing of executing a function to perform reference to help is allocated with a gesture of raising one finger; and processing of executing a function to perform check for status is allocated with a gesture of raising two fingers.

Then, once the image forming apparatus 10 detects a detectable gesture, details of the gesture is checked against details of a registered gesture; if the detected gesture is the registered gesture, processing allocated to the detected, registered gesture is executed. At this time, the display 22 displays an operation screen corresponding to processing allocated to the registered gesture. In other words, in accordance with the detected, registered gesture, a display screen displayed on the display 22 is switched.

The action of the image forming apparatus 10 as described above is implemented by the CPU 12 by executing control program stored in the RAM 14. Particular processing will be described later with a flowchart.

FIG. 6 is an illustrative view showing an example of a memory map 70 of the RAM 14 shown in FIG. 2. As shown in FIG. 6, the RAM 14 includes a program storage area 72 and a data storage area 74. The program storage area 72 in the RAM 14 stores control programs as described above. The control programs include a main processing program 72a, a display program 72b, an operation detection program 72c, a gesture detection program 72d, a determination program 72e, a processing execution program 72f, and a communication program 72g.

The main processing program 72a is a program for executing general processing of the image forming apparatus 10.

The display program 72b is a program for displaying various screens such as the home screen 100 on the display 22 using image formation data 74b described later.

The operation detection program 72c is a program for detecting operation to each part of the image forming apparatus 10. For example, the operation detection program 72c is a program for obtaining touch coordinate data output from the touch panel 20, and detecting operation of a software key included in the various screens displayed on the display 22. The operation detection program 72c is also a program for detecting operational input from the operation button 26a.

The gesture detection program 72d is a program for detecting presence or absence of a gesture and the type of the gesture in accordance with output of the gesture detection part 50. In particular, the gesture detection program 72d is a program for detecting a gesture on the basis of an image within an imaging area included in imaging data output from a camera included in the gesture detection part 50, according to the known detection method described above.

The determination program 72e is a program for determining whether the detected gesture is a registered gesture described in the gesture management table. In particular, the determination program 72e is a program for checking details of the registered gesture described in the gesture management table against details of the detected gesture and determining whether the detected gesture is the registered gesture.

The processing execution program 72f is a program for executing, upon the detected gesture being determined as the registered gesture, processing allocated to the detected, registered gesture.

The communication program 72g is a program for communicating with an external computer and the like via a network.

In addition, although depiction is omitted, the program storage area 72 also stores an image reading program, an image formation program, and the like. The image reading program is a program for controlling the image reading part 30 to read out an image of a document and to output an image signal (image data) corresponding to the read-out image. The image formation program is a program for controlling the image forming part 32 to print a multicolored or monochrome image on a sheet. Moreover, the program storage area 72 also stores a program for selecting and executing various functions included in the image forming apparatus 10.

The data storage area 74 of the RAM 14 stores operation input data 74a, image formation data 74b, gesture information data 74c, table data 74d, and the like.

The operation input data 74a is for example, touch coordinate data or/and operational data detected (obtained) according to the operation detection program 72c. The detected touch coordinate data or/and operational data is stored in accordance with time sequence.

The image formation data 74b is data such as polygon data or texture data, for generating display image data corresponding to various screens, such as a home screen, displayed on the display 22. The image formation data 74b also includes, for example, image data of a software key and the like.

The gesture information data 74c is data for details of a gesture detected according to the gesture detection program 72d.

The table data 74d is data such as the gesture management table described above. In addition, the table data 74d is stored, for example, in a main storage device (the HDD 28) of the image forming apparatus 10. The table data 74d is read out from the HDD 28 and stored in the RAM 14, as needed.

Incidentally, although depiction is omitted, the data storage area 74 may store other data required for executing a control program, or include a timer (counter) and a register that are required for executing a control program.

Figure 7:
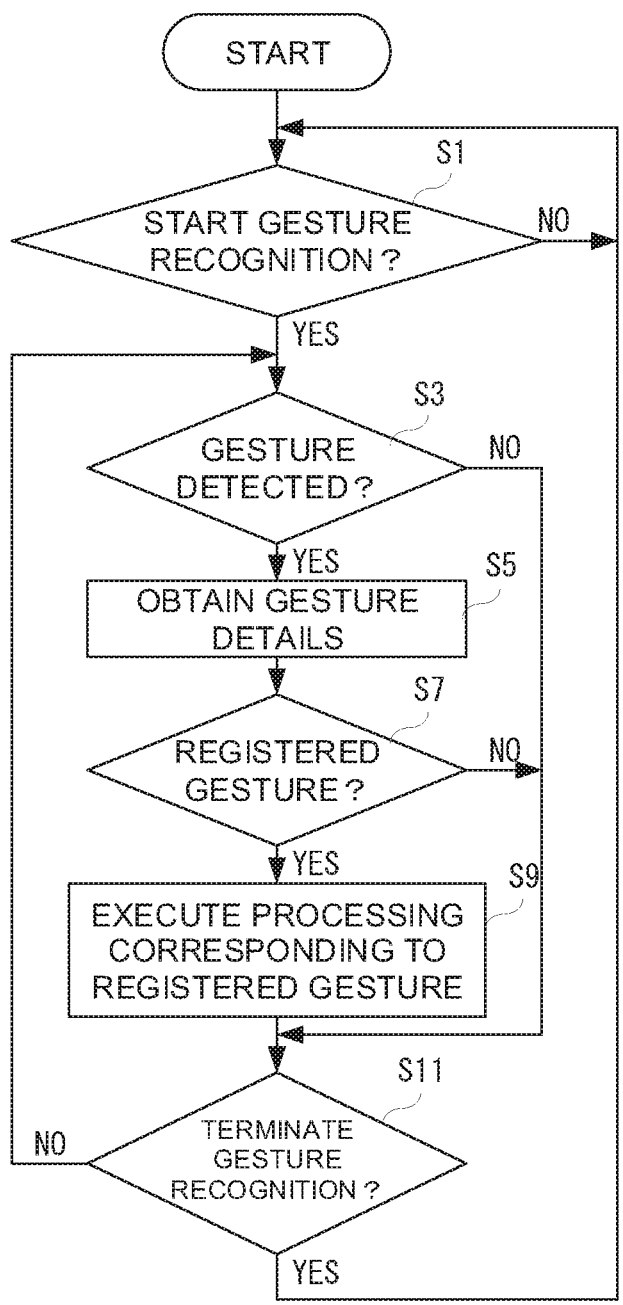
FIG. 7 is a flowchart showing a part of an example of operation processing of the CPU in the image forming apparatus shown in FIG. 2.

FIG. 7 is a flowchart showing a part of an example of operation processing of the CPU 12 in the image forming apparatus 10 shown in FIG. 2. This operation processing is started upon the image forming apparatus 10 being powered on, and is terminated upon the image forming apparatus 10 being powered off. Moreover, this operation processing is executed in parallel with processing of receiving touch operation or button operation onto the operation panel 26.

As shown in FIG. 7, upon starting operation processing, the CPU 12 determines at step S1 whether detection of gesture (gesture recognition) is to be started. Here, whether a start condition is satisfied is determined.

If "NO" at step S1, namely, if determined as detection of gesture not being to be started, the routine returns to step S1. By contrast, if "YES" at step S1, namely, if determined as detection of gesture being to be started, the routine determines at step S3 whether a gesture detectable by the image forming apparatus 10 is detected.

If "NO" at step S3, namely, if determined as a gesture detectable by the image forming apparatus 10 not being detected, the routine goes to step S11 described later. By contrast, if "YES" at step S3, namely, if determined as a gesture detectable in the image forming apparatus 10 being detected, the routine obtains at step S5 details of the detected gesture and determines at step S7 whether the detected gesture is a registered gesture. Here, the routine checks details of the detected gesture against details of the registered gesture, and determines whether details of the detected gesture is identical to details of the registered gesture.

If "NO" at step S7, namely, if determined as the detected gesture not being a registered gesture, the routine goes to step S11 described later. By contrast, if "YES" at step S7, namely, if determined as the detected gesture being a registered gesture, the routine executes at step S9 processing allocated (corresponding) to the registered gesture, and goes to step S11.

At step S11, whether detection of gesture (gesture recognition) is to be terminated is determined. Here, whether the termination condition is satisfied is determined.

If "NO" at step S11, namely, if determined as detection of gesture not being to be terminated, the routine returns to step S3. By contrast, if "YES" at step S11, namely, if determined as detection of gesture being to be terminated, the routine returns to step S1.

According to this first embodiment, the image forming apparatus 10 can be operated by a gesture based on a hand action of a person, thus eliminating need for touch operation or button operation, and providing improved operability of the image forming apparatus 10.

Moreover, according to this first embodiment, the image forming apparatus 10 can be operated by a gesture based on a hand action of a person, thus eliminating need for finding out an icon or button applied with desired processing, and providing improved operability of the image forming apparatus 10.

Furthermore, according to the first embodiment, detection is made for gesture using imaging data taken for a predetermined area set in front of the image forming apparatus 10, thus allowing many types of gestures to be detected. This therefore allows the image forming apparatus 10 to execute many types of processing by a gesture, and provides improved operability of the image forming apparatus 10.

Second Embodiment

Since the image forming apparatus 10 of the second embodiment is the same as in the first embodiment except for performing authentication processing for a user about to utilize the image forming apparatus 10 and allowing a combination of a registered gesture and processing to be set for every preregistered user (registered user), details different from the first embodiment will be described and duplicate description will be omitted.

In the second embodiment, user authentication of a person about to utilize the image forming apparatus 10 can be performed. Here, the user authentication is started (executed) if a predetermined operation for starting user authentication (authentication start operation) is performed. Additionally, in order to receive authentication start operation, a software key for starting the user authentication may be displayed on the home screen 100, or a hardware key for starting user authentication may be disposed on the operation panel 26.

Additionally, methods of user authentication are not limited to a specific method. For example, user authentication may be made to be performed by a combination of a user ID and a password that are input to the operation panel 26. In addition, if the image forming apparatus 10 includes a local communication part for performing local wireless communication, user authentication may also be made to be performed by raising a storage medium carried by a registered user, such as an IC card, a smartphone, or a featurephone, over the local communication part. Furthermore, if the image forming apparatus 10 includes a physical characteristics detection part for detecting physical characteristics of a person such as a face or a fingerprint, user authentication with physical characteristics of a registered user may also be performed.

Moreover, in the second embodiment, a combination of a registered gesture and processing that is executable in the image forming apparatus 10 is set for every registered user. Accordingly, after user authentication is performed and the authentication is succeeded (after login), and then when a registered gesture is detected, processing allocated to the registered gesture is executed in accordance with a combination of the registered gesture and the processing for a registered user during login.

For example, settings for a combination of a registered gesture and processing for every registered user (combination settings) are managed with a gesture management table as shown in FIG. 8.

As shown in FIG. 8, the gesture management table describes processing details and details of registered gesture, corresponding to a user ID for every registered user. For example, in the case of a first registered user with the user ID of "A", processing of selecting a copying job is allocated with a gesture of moving a hand leftward as seen from a user; processing of selecting a FAX job is allocated with a gesture of moving a hand rightward as seen from a user; and processing of selecting a scanning job is allocated with a gesture of moving a hand downward.

Moreover, in the case of a second registered user with the user ID of "B", processing of selecting a copying job is allocated with a gesture of moving a hand upward; processing of selecting a FAX job is allocated with a gesture of moving a hand as drawing a circle; and processing of selecting a scanning job is allocated with a gesture of moving a hand as drawing a triangle.

Furthermore, in the case of a third registered user with the user ID of "C", processing of selecting a copying job is allocated with a gesture of moving a hand downward; processing of selecting a FAX job is allocated with a gesture of moving a hand leftward as seen from a user; and processing of selecting a scanning job is allocated with a gesture of moving a hand as drawing a circle.

In this regard, settings of combinations for every registered user can be changed. For example, during login by a registered user, if a predetermined operation for changing settings of combinations for the registered user (change start operation) is performed, a setting changing screen for changing the settings of combinations may be made to be displayed on the display 22.

Incidentally, an action of the image forming apparatus 10 in the case of operating the image forming apparatus 10 by a user other than a registered user (common user) is the same as in the first embodiment, and its description is omitted. In addition, if detection of gesture is started without user authentication (without being logged in) or after logout, an operator of the image forming apparatus 10, even a registered user, is treated as a common user.

Although depiction is omitted, control programs stored in the RAM 14 also include an authentication program for performing user authentication in accordance with an input operation to the image forming apparatus 10 and the like. Moreover, the data storage area 74 in the RAM 14 stores authentication information data for authentication information of a registered user. In this regard, the authentication information data is stored in a predetermined storage such as the HDD 28 or an external server. The authentication information data is read out from the storage and stored in the RAM 14, as needed.

The actions of the image forming apparatus 10 as described above is implemented by the CPU 12 by executing control programs including an authentication program. Hereinafter, operation processing in the second embodiment will be described using a flowchart, in which processing as same as the operation processing described in the first embodiment will be indicated with the same referential code, and duplicated details will be omitted in description or described briefly.

Figure 9:
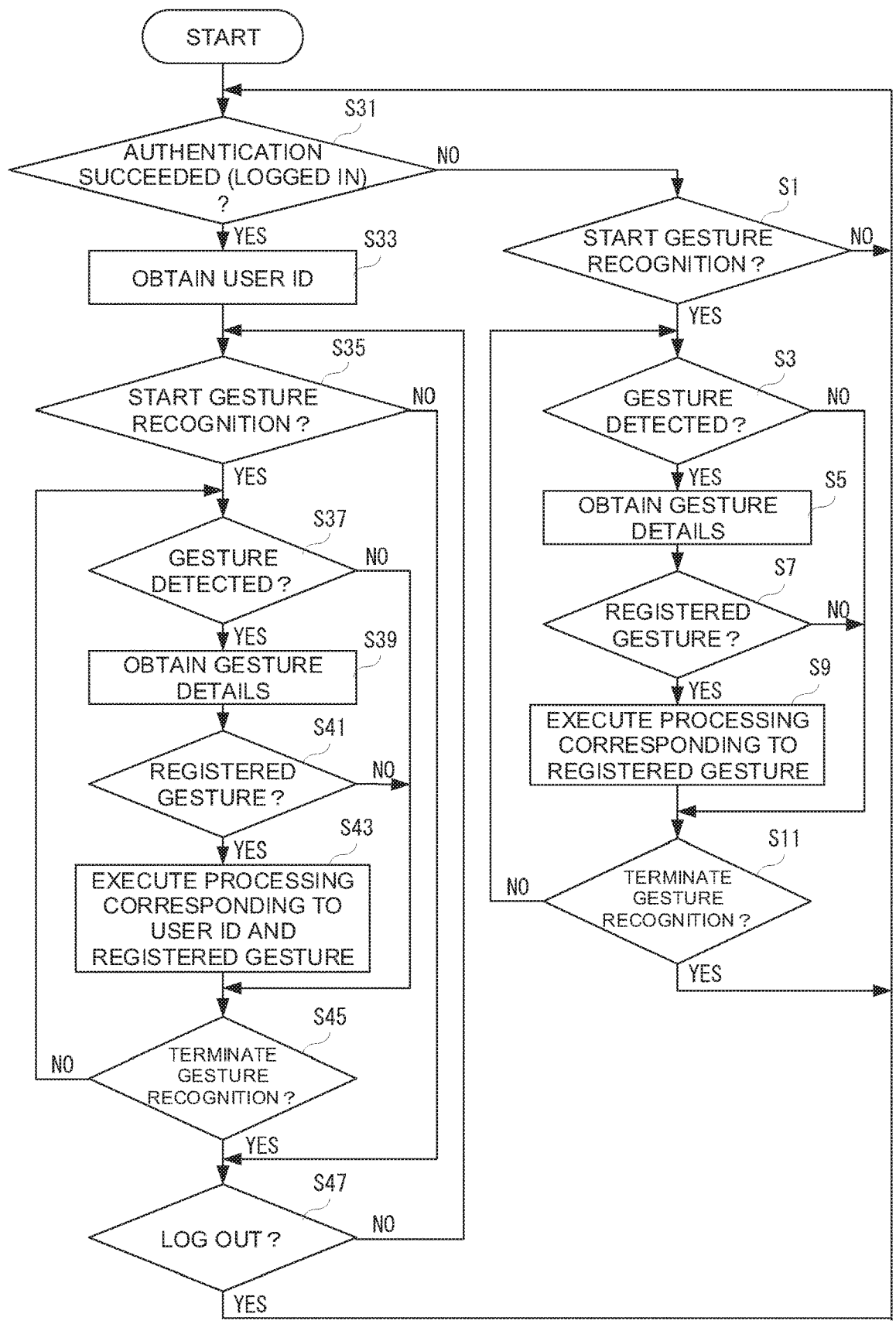
FIG. 9 is a flowchart showing a part of an example of operation processing of the second embodiment.

FIG. 9 is a flowchart showing a part of an example of operation processing of the second embodiment. As shown in FIG. 9, upon starting operation processing, the CPU 12 determines at step S31 whether user authentication is succeeded (login). If "NO" at step S31, namely, if determined as user authentication not being succeeded, the routine goes to step S1. Here, the cases of determining as user authentication not being succeeded include not only the case of user authentication being started and the authentication being failed, but also the case of user authentication in itself not being performed. By contrast, if "YES" at step S31, namely, if determined as user authentication being succeeded, the routine obtains at step S33 a user ID and determines at step S35 whether detection of gesture is to be started.

If "NO" at step S35, the routine goes to step S47 described later. By contrast, if "YES" at step S35, the routine determines at step S37 whether a gesture detectable by the image forming apparatus 10 is detected.

If "NO" at step S37, the routine goes to step S45 described later. By contrast, if "YES" at step S37, the routine obtains at step S39 details of the detected gesture and determines at step S41 whether it is a registered gesture. If "NO" at step S41, the routine goes to step S45 described later. By contrast, if "YES" at step S41, the routine executes at step S43 processing allocated to the registered gesture in accordance with settings of a combination of a registered gesture and processing for the registered user during login.

Subsequently, the routine determines at step S45 whether detection of gesture is to be terminated. If "NO" at step S45, the routine returns to step S37. By contrast, if "YES" at step S45, the routine determines at step S47 whether to be logged out. If "YES" at step S47, namely, if determined as to be logged out, the routine returns to step S31. By contrast, if "NO" at step S47, namely, if not to be logged out, the routine returns to step S35.

Incidentally, details of the processing of step S1 through step S11 is the same as in the first embodiment except for returning to step S31 if "NO" at step S1 and returning to step S31 if "YES" at step S11, and therefore its description is omitted.

In this second embodiment, authentication processing has been performed for a user about to utilize the image forming apparatus 10, and a combination of registered gesture and processing is made to be set for every registered user. This also allows setting of a combination of a registered gesture and processing depending on preference of a registered user, thus providing convenience.

Third Embodiment

Since the image forming apparatus 10 in the third embodiment is the same as in the first embodiment except for including a power source control part 54, details different from the first embodiment will be described and duplicated description will be omitted.

Figure 10:
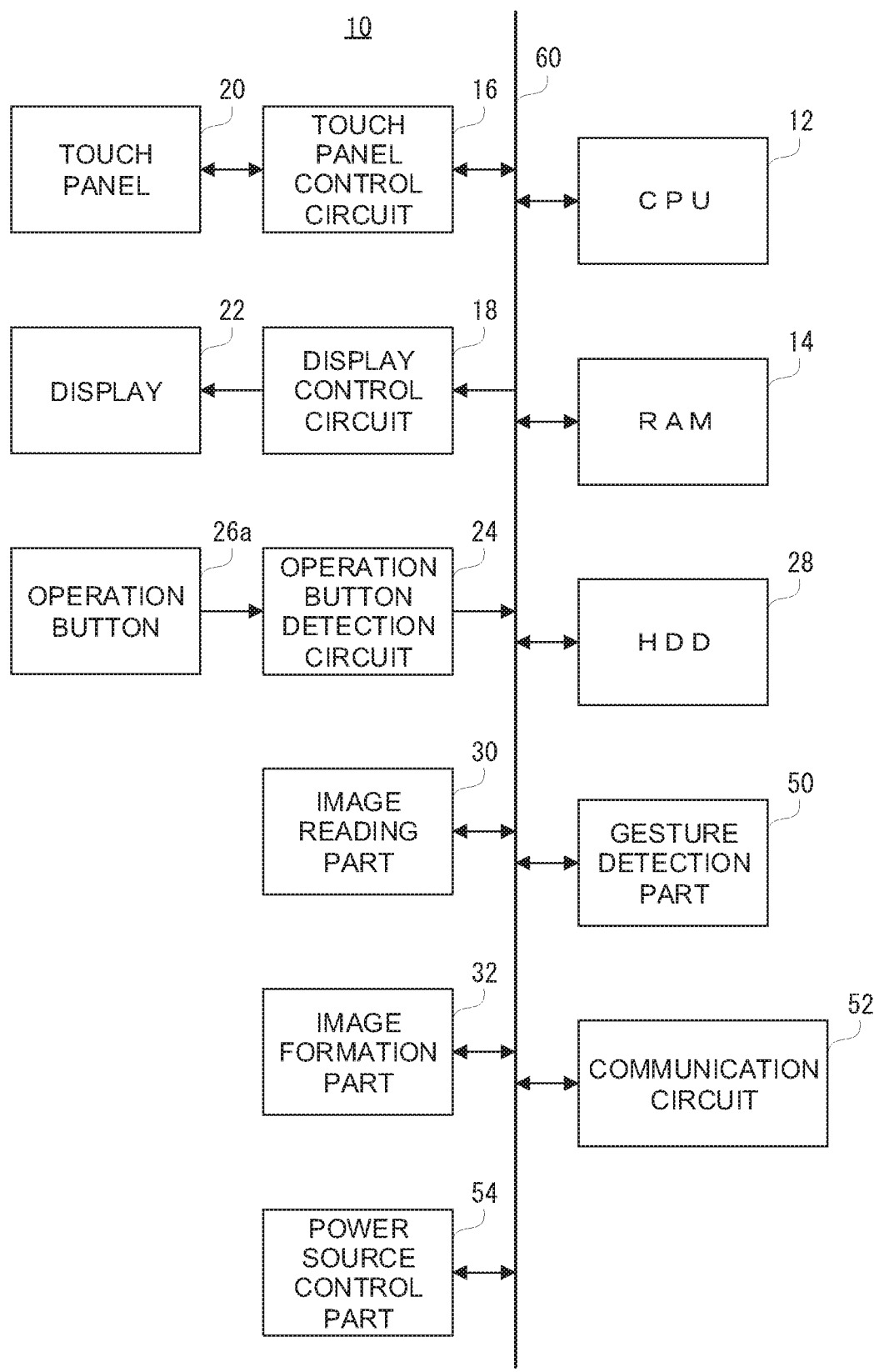
FIG. 10 is a block diagram showing an electrical configuration of the image forming apparatus of the third embodiment.

FIG. 10 is a block diagram showing an electrical configuration of the image forming apparatus 10 of the third embodiment. As shown in FIG. 10, in the third embodiment, the image forming apparatus 10 includes the power source control part 54. The power source control part 54 is connected to the CPU 12 via a bus 60.

The power source control part 54 is a circuit for stopping or supplying a power source (electrical voltage) to each component (switch circuit) under instruction from the CPU 12. Although depiction is omitted, the power source control part 54 is applied with direct-current electrical voltage (direct-current power source) in which alternating-current electrical voltage from a commercial power source is appropriately stepped down and rectified (noise-eliminated).

In the third embodiment, the image forming apparatus 10 has action states: a power-saving state (power-saving mode) with power consumption limited and a normal state (normal mode) with power consumption unlimited.

Additionally, in the third embodiment, the operation buttons 26a include a power-saving key. The power-saving key is a key for switching between the power-saving mode and the normal mode.

In the normal mode, the CPU 12 controls the power source control part 54 to supply a power source to all components in the image forming apparatus 10. By contrast, in the power-saving mode, the CPU 12 controls the power source control part 54 to supply a power source to at least, a power-saving key included in the operation panel 26, the operation button detection circuit 24, the gesture detection part 50, the communication circuit 52, and the like, and not to supply a power source to some components in the image forming apparatus 10.

Here, in the power-saving mode, power consumption of the image forming apparatus 10 is controlled so as to be no more than a preset predetermined value (e.g., a small percent of the maximal power consumption). Accordingly, the types and number of components supplied with a power source in the power-saving mode is determined taking into account the size of the predetermined value and the volume of power consumption of each component. For example, in the power-saving mode, power is not supplied to the touch panel 20, the display 22, the image reading part 30, the image forming part 32, and the like.

Moreover, the normal mode and the power-saving mode is alternately switched depending on a user's operation or automatically.

In the embodiment, in the power-saving mode, when a predetermined user operation is received, switch (shift) from the power-saving mode to the normal mode occurs automatically. Here, the user operation means not only operation of the power-saving key described above but also operation of the image forming apparatus 10 to each part by a user. For example, this also includes operation of setting a document on the document tray 34 by a user, operation of a variety of the operation buttons 26a included in the operation panel 26, gestures, and the like.

On the other hand, in the normal mode, when a predetermined condition (shift condition) is satisfied, shift to the power-saving mode is made. Here, the shift condition, for example, may be made to be satisfied by operating the power-saving key included in the operation panel 26, or may be made to be satisfied by experiencing a lapse of a first predetermined time period (e.g., 30-60 seconds) without operating any of the individual parts of the image forming apparatus 10.

In this regard, in the image forming apparatus 10 of the third embodiment, when shift from the normal mode to the power-saving mode is made, a second predetermined time period (e.g., 20-30 seconds) is preset as a preparatory period (extension period) for shifting to the power-saving mode.

Thus, in the normal mode, when the second predetermined time period is further lapsed from the time point of satisfying the shift condition, switch from the normal mode to the power-saving mode occurs automatically. In other words, in the normal mode, during a duration from the time point of satisfying the shift condition until a lapse of the second predetermined time period, the normal mode is maintained. Additionally, in the normal mode, when the shift condition is satisfied, the numeral showing the remaining time until a lapse of the second predetermined time period (the remaining time of the preparatory period) is displayed on the display 22. In other words, the remaining time until switching to the power-saving mode is counted down.

In this regard, in the normal mode, satisfying the shift condition leads to satisfying the start condition for starting detection of gesture. Then, if a registered gesture is detected during the preparatory period for shifting to the power-saving mode, shift to the power-saving mode is forbidden (suspended). In other words, if a registered gesture is detected during the preparatory period for shifting to the power-saving mode, the normal mode is maintained.

Furthermore, if a registered gesture is detected during the preparatory period for shifting to the power-saving mode, processing allocated to the registered gesture is executed in addition to the shift to the power-saving mode being forbidden.

Although depiction is omitted, control programs stored in the RAM 14 include a power source control program. The power source control program is a program for controlling the power source control part 54 to switch between the normal mode and the power-saving mode, and to supply and stop a power source to each component. In particular, the power source control program is a program for stopping supply of a power source to some components when the second predetermined time period is lapsed from the time point of satisfying the shift condition in the normal mode. The power source control program is also a program for supplying a power source to all components in the image forming apparatus 10 when a user operation is made in the power-saving mode.

The actions of the image forming apparatus 10 as described above are implemented by the CPU 12 by executing control programs including a power source control program.

Hereinafter, operation processing in the third embodiment will be described using a flowchart, in which processing as same as the operation processing described in the first embodiment will be indicated with the same referential code, and duplicated details will be omitted in description or described briefly.

Figure 11:
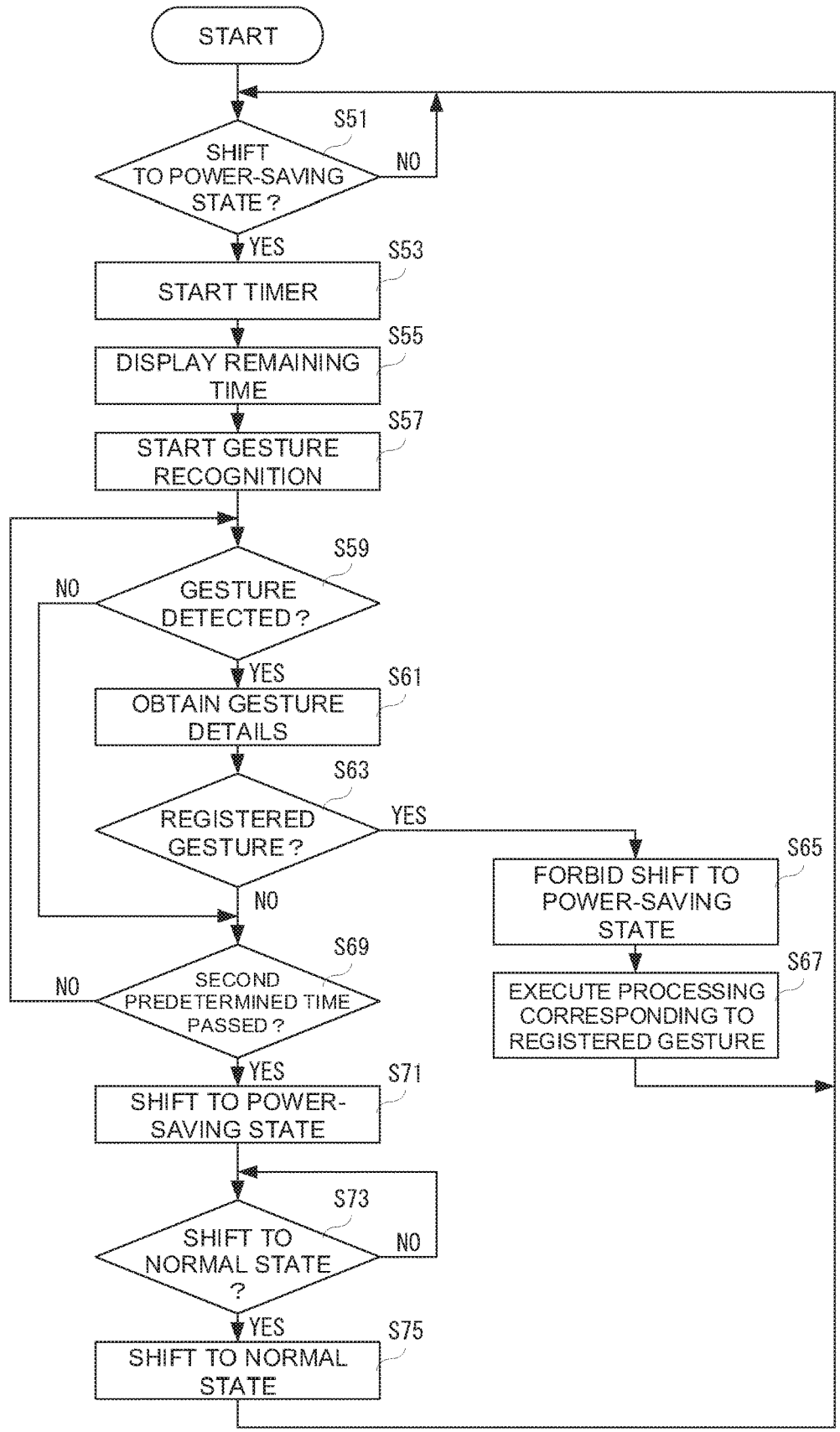
FIG. 11 is a flowchart showing a part of an example of operation processing of the third embodiment.

FIG. 11 is a flowchart showing a part of an example of operation processing of the third embodiment. This operation processing is started when the image forming apparatus 10 is powered on. In this regard, when the image forming apparatus 10 is powered on, the normal mode is set. As shown in FIG. 11, upon starting operation processing, the CPU 12 determines at step S51 whether to shift to the power-saving mode. Here, whether the shift condition is satisfied is determined.

If "NO" at step S51, namely, if determined not to shift to the power-saving mode, the routine returns to step S51. By contrast, if "YES" at step S51, namely, if determined to shift to the power-saving mode, the routine starts a timer at step S53. Here, the timer is a timer for counting a duration time from the time point of satisfying the shift condition in the normal mode, and is disposed inside the image forming apparatus 10 (in the CPU 12 or RAM 14) although depiction is omitted.

Subsequently, the routine displays on the display 22 at step S55 the remaining time until a lapse of the second predetermined time period, and starts detection of gesture at step S57, and determines at step S59 whether a gesture is detected.

If "NO" at step S59, the routine goes to step S69 described later. By contrast, if "YES" at step S59, the routine obtains at step S61 details of the detected gesture and determines at step S63 whether the detected gesture is a registered gesture.

If "YES" at step S63, namely, if determined as the detected gesture being a registered gesture, the routine suspends at step S65 shift to the power-saving mode, executes at step S67 processing allocated to the detected, registered gesture, and returns to step S51.

By contrast, if "NO" at step S63, namely, if determined as the detected gesture not being a registered gesture, the routine determined at step S69 whether the second predetermined time period is lapsed. Here, whether the count of the timer exceeds the second predetermined time period is determined. If "NO" at step S69, namely, if determined as the second predetermined time period not being lapsed, the routine returns to step S59.

By contrast, if "YES" at step S69, namely, if determined as the second predetermined time period being lapsed, the routine shifts to the power-saving mode at step S71 and determines at step S73 whether to shift to the normal mode. Here, whether a user operation is made is determined. If "NO" at step S73, namely, if determined not to shift to the normal mode, the routine returns to step S73. By contrast, if "YES" at step S73, namely, if determined to shift to the normal mode, the routine shifts to the normal mode at step S75 and returns to step S51.

According to this third embodiment, the power-saving mode is forbidden if a registered gesture is detected during the preparatory period for shifting to the power-saving mode, and thus it is possible to prevent shift to the power-saving mode at a user's unintended timing such as the case of accidentally operating the power-saving key or the case that a user reaches in front of the image forming apparatus 10 at a timing of shift to the power-saving mode.

Moreover, according to the third embodiment, the numeral showing the remaining time of the preparatory period is displayed on the display 22, thus enabling the user to recognize a time duration until shift to the power-saving mode and allowing to prevent shift to the power-saving mode at a user's unintended timing.

Incidentally, the aspect showing in the third embodiment can also be employed in combination with the second embodiment.

Furthermore, in the third embodiment, the numeral showing the remaining time until a lapse of the second predetermined time period is made to be displayed on the display 22, but there is no need to limit to this. For example, if the image forming apparatus 10 includes a LED lamp, the LED Lamp may be blinked from the time point of satisfying the shift condition in the normal mode, and then the interval of blinking the LED lamp may be changed (the interval of blinking may be extended or shortened) as the remaining time until a lapse of the second predetermined time period decreases. In addition, if the image forming apparatus 10 includes a plurality of LED lamps, the number of blinking LED lamps may be changed (the number of blinking lamps may be increased or decreased) as the remaining time until a lapse of the second predetermined time period decreases.

Incidentally, particular configurations or the like given in the embodiments described above are an example, and can be appropriately changed depending on an actual product. Additionally, each step of the flowcharts shown in the embodiments described above can be appropriately changed in order of processing, as long as the same result can be provided.

Additionally, in the embodiments, the image forming apparatus 10 is made to include the gesture detection part 50, but there is no need to limit to this. For example, instead of or in addition to the gesture detection part 50, a gesture detection device may be disposed in the vicinity of the image forming apparatus 10 as an external device corresponding to the gesture detection part 50. In this case, the image forming apparatus 10 and the gesture detection device is communicably disposed, and the gesture detection device outputs data of a gesture corresponding to a hand action of a user present in front or in the vicinity of the apparatus body 36, to the CPU 12. The gesture detection device is, for example, a camera disposed on a ceiling or wall in the place where the image forming apparatus 10 is installed.

Furthermore, in the embodiments described above, each of a plurality of registered gestures is made to be allocated to processing for selecting each job in the home screen 100 or processing other than selection of each job in the home screen 100, but there is no need to limit to this. For example, processing corresponding to various operations in a setting screen for setting an action condition of a job may be allocated.

DESCRIPTION OF THE REFERENCE NUMERALS

10—Image forming apparatus
12—CPU
14—RAM
28—Storage part
30—Image reading part
32—Image forming part
50—Gesture detection part
52—Communication circuit

What is claimed is:

1. An image forming apparatus comprising:
    a memory that stores instructions;
    an apparatus body;
    detecting circuitry that detect a gesture based on a hand action of a person present around the apparatus body;
    determining circuitry that determine, upon a detection of the gesture by the detecting circuitry, whether the gesture is a registered gesture corresponding to predetermined processing; and
    a processor that executes the instructions stored in the memory, that executes processing allocated to the registered gesture upon a determination as the gesture detected by the determining circuitry being the registered gesture,
    wherein the image forming apparatus has a power-saving state with power consumption limited to no more than a predetermined value and a normal state with power consumption unlimited, and
    further comprises state setting circuitry that sets the power-saving state after a lapse of a predetermined time period from the time point of satisfying a predetermined condition in the normal state,
    wherein the processor executes processing of forbidding setting of the power-saving state, upon a detection of the registered gesture by the detecting circuitry for a duration from the time of satisfying the predetermined condition until a lapse of the predetermined time period.

2. The image forming apparatus according to claim 1, further comprising: imaging circuitry that take a captured image comprising an image of a person present around the image forming apparatus,
    wherein the detecting circuitry detect the gesture from the captured image.

3. The image forming apparatus according to claim 1, further comprising:
    authenticating circuitry that perform user authentication processing for a person about to utilize the image forming apparatus and permits login to the image forming apparatus for a preregistered, registered user; and
    a memory that stores a combination of the registered gesture and processing allocated to the registered gesture for every registered user,
    wherein the processor, upon a permission of login in the authenticating circuitry, executes processing allocated to the registered gesture, in accordance with a combination of the registered gesture and the processing for the registered user permitted for login.

4. A non-transitory computer-readable medium storing a control program of an image forming apparatus comprising an apparatus body,
    the program causing a processor of the image forming apparatus to execute:
    detecting a gesture based on a hand action of a person present around the apparatus body, and executing processing allocated to the gesture upon a detection of the gesture is detected by the detecting,
    wherein the image forming apparatus has a power-saving state with power consumption limited to no more than a predetermined value and a normal state with power consumption unlimited, and
    wherein the processor further sets the power-saving state after a lapse of a predetermined time period from the time point of satisfying a predetermined condition in the normal state, and
    executing processing of forbidding setting of the power-saving state, upon a detection of the registered gesture for a duration from the time of satisfying the predetermined condition until a lapse of the predetermined time period.

5. A control method of an image forming apparatus comprising an apparatus body, the method comprising:
    (a) detecting a gesture based on a hand action of a person present around the apparatus body;
    (b) executing processing allocated to the gesture, upon a detection of the gesture,
    wherein the image forming apparatus has a power-saving state with power consumption limited to no more than a predetermined value and a normal state with power consumption unlimited;
    (c) setting the power-saving state after a lapse of a predetermined time period from the time point of satisfying a predetermined condition in the normal state; and
    (d) executing processing of forbidding setting of the power-saving state, upon a detection of the registered gesture by the detecting circuitry for a duration from the time of satisfying the predetermined condition until a lapse of the predetermined time period.

* * * * *